United States Patent [19]

Tomita et al.

[11] Patent Number: 4,698,694
[45] Date of Patent: Oct. 6, 1987

[54] VIDEO SIGNAL PROCESSING APPARATUS FOR VIDEO TAPE RECORDERS

[75] Inventors: Masao Tomita, Neyagawa; Akio Hashima, Kyoto, both of Japan

[73] Assignee: Matsushita Electric Industrial Co., Ltd., Kadoma, Japan

[21] Appl. No.: 591,333

[22] Filed: Mar. 19, 1984

[30] Foreign Application Priority Data

Mar. 18, 1983 [JP] Japan ................................ 58-46218
May 10, 1983 [JP] Japan ................................ 58-82036
Jun. 20, 1983 [JP] Japan ................................ 58-111223
Jun. 24, 1983 [JP] Japan ................................ 58-114529

[51] Int. Cl.$^4$ .......................................... H04N 9/80
[52] U.S. Cl. ............................. 358/326; 358/310; 358/330; 358/320; 358/328; 358/329; 360/36.2
[58] Field of Search ............. 358/310, 330, 320, 323, 358/325, 326, 327, 328, 329; 360/32, 36.1, 36.2

[56] References Cited

U.S. PATENT DOCUMENTS

| | | | |
|---|---|---|---|
| 3,921,132 | 11/1975 | Baldwin | 360/33.1 |
| 3,968,514 | 7/1976 | Narahara | 358/310 |
| 4,018,990 | 4/1977 | Long | 360/36.2 |
| 4,068,257 | 1/1978 | Hirota | 358/316 |
| 4,177,481 | 12/1979 | Yanagiwa | 358/328 |
| 4,295,154 | 10/1981 | Hata | 358/329 |
| 4,335,393 | 6/1982 | Pearson | 358/12 |
| 4,464,685 | 8/1984 | Wilkinson | 358/310 |
| 4,593,327 | 6/1986 | Hirota | 358/330 |

*Primary Examiner*—Alan Faber
*Attorney, Agent, or Firm*—Wenderoth, Lind & Ponack

[57] ABSTRACT

A video signal processing apparatus used for a video tape recorder performs chrominance signal processing which is digitalized. The chrominance signal is up-converted and phase-shifted in a recording block, and, in a reproducing block, phase-shifted in the opposite direction, filtered by a comb filter, compensated for jitter, and up-converted to the original chrominance signal. Both the recording block and the reproducing block are digitalized or only the reproducing block is digitalized. The digital chrominance signal processing circuit includes an A/D converter, a digital phase shifter, a digital comb filter, a digital jitter compensator, and a D/A converter.

21 Claims, 11 Drawing Figures

VIDEO SIGNAL PROCESSING APPARATUS FOR VIDEO TAPE RECORDERS

BACKGROUND OF THE INVENTION

1. Field of the Invention

This invention relates to an apparatus for processing a video signal in a video tape recorder, and more particularly to an apparatus for processing a video signal, in which the chrominance signal is processed in a digital signal form.

2. Description of the Prior Art

Generally, in the widely used commercial color VTRs, the luminance signal is converted to a frequency modulated luminance signal (FM luminance signal, hereafter) positioned at upper band in the recordable frequency band, and the chrominance signal is frequency converted to be lower in frequency band than the FM luminance signal. The FM luminance signal and the down-converted chrominance signal are multiplexed, and the multiplexed signal is recorded on the magnetic tape.

In the reproducing mode, the multiplexed signal reproduced from the magnetic tape is separated to the FM luminance signal and the down-converted chrominance signal. The FM luminance signal is demodulated to be the original luminance signal, and the down-converted signal is frequency-converted to the original chrominance signal.

In the conventional signal processing method as described above, the chrominace signal needs to be executed various complicated signal processing. This makes it difficult to realize a simple and small-sized signal processing circuit.

For example, in the commercial VTR the so-called jutter is caused by the variation of the relative speed between the magnetic tape and the rotary magnetic head, due to the performance variation of the servo system or the stretched magnetic tape. The jitter causes phase fluctuation of the reproduced chrominance signal, and therefore not-uniformity in color of the reproduced color picture. To avoid the phase fluctuation of the chrominance signal, an automatic phase control (APC) system is usually provided in the reproducing side chrominance signal processing block. However, the APC system makes the whole circuit very complex in configuration, large in size, and expensive in cost.

Further, in the adimus recording method without guard tracks, a comb filter is employed as a one horizontal line delay device to reduce the cross talk signals from the adjacent track in the reproducing mode. This comb filter is usually comprised of a glass delay line which is large in size and expensive. Accordingly, the signal processing circuit cannot be made compact and inexpensive.

Figure 1:
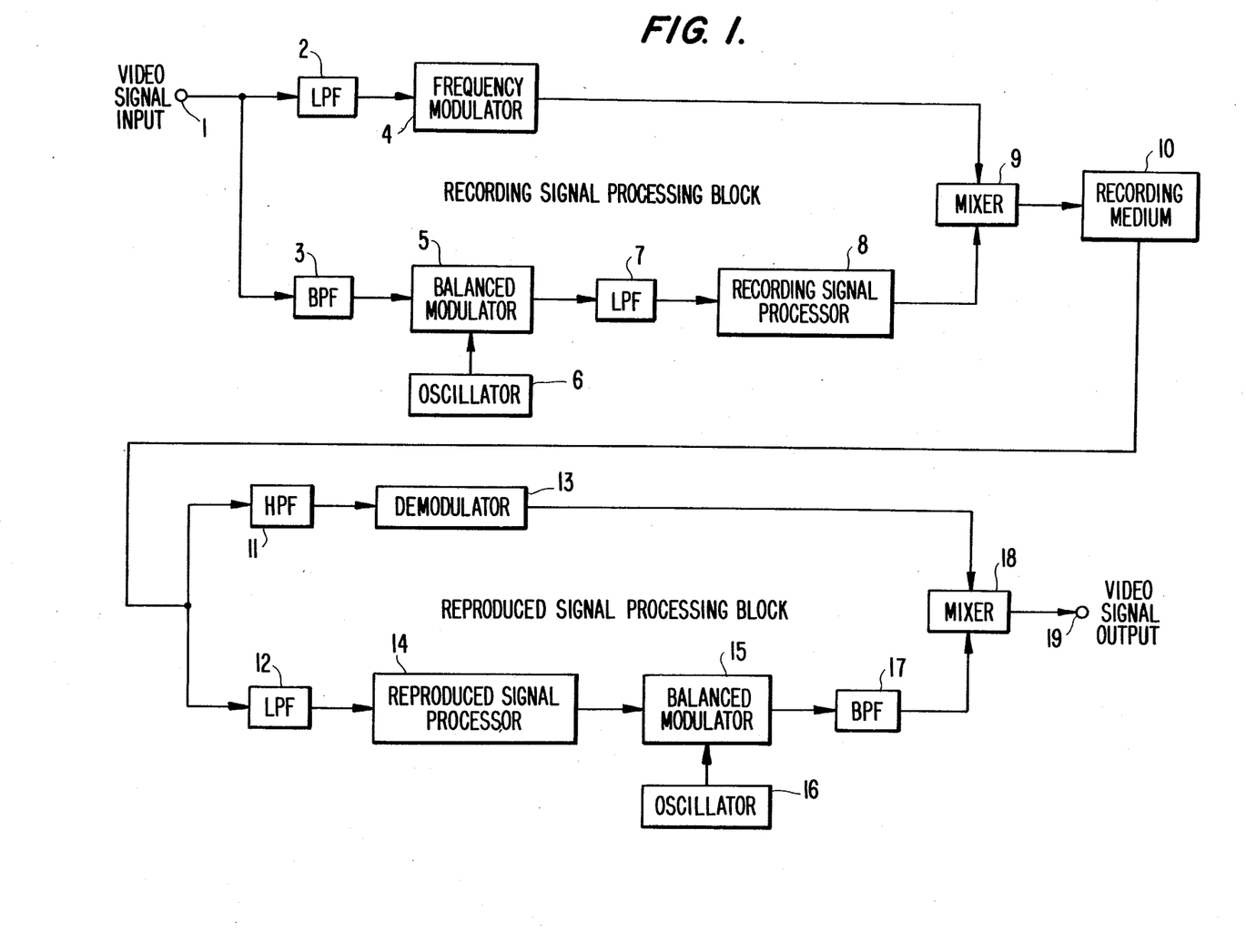
FIG. 1 is a block diagram of the typical conventional video signal processing apparatus used for the conventional VTR.

FIG. 1 is a block diagram of the main portion of a typical conventional VTR for explaining the luminance and chrominance signal processings. In the recording signal processing block, a composite video signal applied to an input terminal 1 is separated to the luminance signal and the chrominance signal by a low-pass filter 2 and a band-pass filter 3. The luminance signal is frequency modulated by a frequency modulator 4 and the obtained FM luminance signal is supplied to a mixer 9. The chrominance signal is converted to a low frequency band signal (down-converted chrominance signal) by a balanced modulator 5 with a local oscillator 6 and a low-pass filter 7. The down-converted chrominance signal is processed, or phase-shifted, for example, by a recording signal processor 8, and supplied to the mixer 9. The FM luminance signal and the processed down-converted chrominance signal are multiplexed by the mixer 9. The multiplexed signal is recorded on a recording medium 10 such as a magnetic tape.

In the reproduced signal processing block, the reproduced signal from the recording medium 10 is separated to the FM luminance signal and the down-converted chrominance signal by a high-pass filter 11 and a low-pass filter 12. The FM luminance signal is demodulated to the original luminance signal by a demodulator 13 and the original luminance signal is inputted to a mixer 18. The reproduced down-converted chrominance signal is executed. by a reproduced signal processor 14 with processes such as phase shifting, automatic phase controlling, and comb filtering, and converted to the original chrominance signal by a balanced modulator 15 with a local oscillator 16 and a band-pass filter 17. The original chrominance signal is mixed with the original luminance signal by the mixer 18 to be a composite video signal which is supplied to an output terminal 19.

In view of the above, since the above described complicated chrominance signal processing is achieved in analog signal form, the circuit configuration is complicated and large-sized.

SUMMARY OF THE INVENTION

An object of this invention is to provide an apparatus for digitalized chrominance signal processing in VTR.

Another object of the invention is to provide a small-sized video signal processing apparatus for VTR.

A further object of the invention is to provide a inexpensive video signal processing apparatus for VTR.

A further object of the invention is to provide a video signal processing apparatus for VTR which requires few adjustments in production line.

These objects are achieved by providing a video signal processing apparatus according to the present invention, which comprises: first separating means for separating an input video signal to a luminance signal and a chrominance signal; second separating means for separating a reproduced signal from said recording medium to a reproduced luminance signal and a reproduced chrominance signal; luminance signal processing means for processing said luminance signal from said first separating means to produce a recordable luminance signal and processing said reproduced luminance signal from said second separating means to produce an original luminance signal; digital chrominance signal processing means for digitally processing said chrominance signal from said first separating means to produce a recordable chrominance signal and for digitally processing said reproduced chrominance signal from said second separating means to produce an original chrominance signal; first mixing means for mixing said recordable luminance and chrominance signals, the mixed recordable signal being recorded onto said recording medium; and second mixing means for mixing said original luminance and chrominance signals to produce an original video signal.

Also, a video signal processing apparatus according to the present invention comprises: first separating means for separating an input video signal to a luminance signal and a chrominance signal; second separating means for separating a reproduced signal from said recording medium to a reproduced luminance signal and a reproduced chrominance signal; luminance signal processing means for processing said luminance signal from said first separating means to produce a recordable luminance signal and processing said reproduced luminance signal from said second separating means to produce an original luminance signal; first chrominance signal processing means for processing said chrominance signal from said first separating means to produce a recordable chrominance signal; second chrominance signal processing means for digitally processing said reproduced chrominance signal from said second separating means to produce an original chrominance signal; first mixing means for mixing said recordable luminance and chrominance signals, the mixed recordable signal being recorded onto said recording medium; and second mixing means for mixing said original luminance and chrominance signals to produce an original video signal.

Further, a video signal processing apparatus according to the present invention preferably comprises: first separating means for separating an input video signal to a luminance signal and a chrominance signal; second separating means for separating a reproduced signal from said recording medium to a reproduced luminance signal and a reproduced chrominance signal; luminance signal processing means for processing said luminance signal from said first separating means to produce a recordable luminance signal and processing said reproduced luminance signal from said second separating means to produce an original luminance signal; a first balanced modulator for down-converting the frequency band of said chrominance signal from said first separating means; a first phase shifter for shifting the phase of the down-converted chrominance signal from said first balanced modulator to produce a recordable chrominance signal; first mixing means for mixing said recordable luminance and chrominance signals, the mixed recordable signal being recorded onto said recording medium; an AD converter for converting said reproduced chrominance signal from said second separating means to a digital signal; a digital phase shifter for shifting the phase of said digital signal from said AD converter in the direction opposite to the shifted direction by said first phase shifter; a digital comb filter for filtering the phase-shifted signal from said digital phase shifter; digital jitter compensation means for eliminating a jitter of said reproduced chrominance signal; a DA converter for converting an output digital signal from said digital jitter compensation means to an original down-converted chrominance signal; a second balanced modulator for up-converting the frequency band of said down-converted chrominance signal from said DA converter to produce an original chrominance signal; and second mixing means for mixing said original luminance and chrominance signals to produce an original video signal.

These and other objects and features of the invention will be apparent from the consideration of the following detailed description taken together with the accompanying drawings, in which:

DESCRIPTION OF THE PREFERRED EMBODIMENTS

Hereinafter, this invention will be described in detail with reference to some preferred embodiments in association with the drawings.

Figure 2:
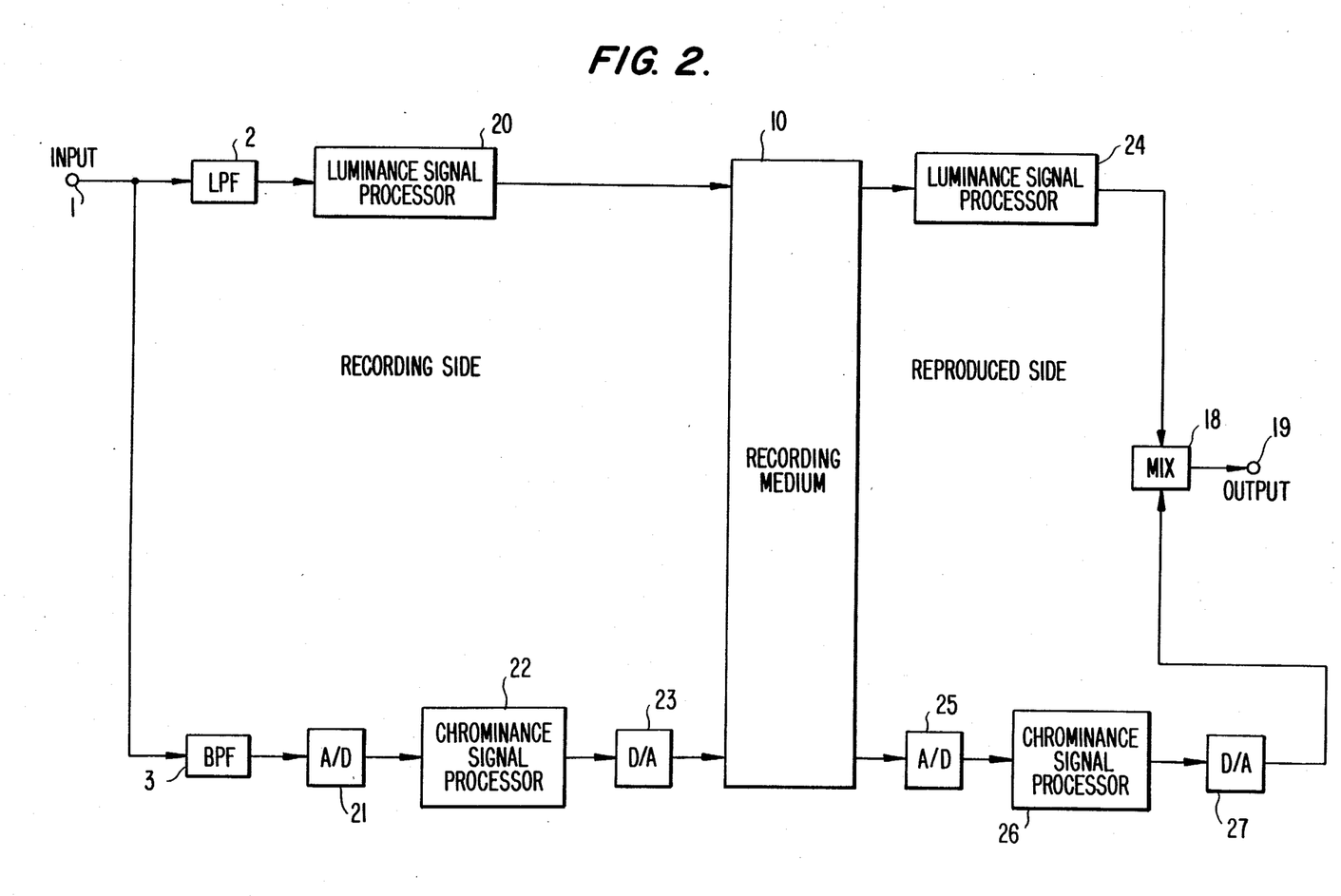
FIG. 2 is a basic block diagram showing the main concept of the present invention.

FIG. 2 is a block diagram showing a basic structure of an embodiment of a video signal processing apparatus according to the invention, wherein the same structural elements as those in FIG. 1 are designated by the same reference numerals as those in FIG. 1.

Reference numeral 1 is an input terminal for inputting the recording video signal and 19 is an output terminal for outputting the reproduced video signal, respectively. Numerals 2 and 3 are a low-pass filter and a band-pass filter for separately obtaining the luminance signal and the chrominance signal, respectively, from the input video signal. Numeral 20 is a luminance signal processor for processing the luminance signal in the recording signal processing block. Numeral 21 is an analog-to-digital converter (AD converter, hereinafter)for converting the analog chrominance signal to a digital chrominance signal, and numeral 22 is a chrominance signal processor for processing the digital chrominance signal in the recording signal processing block. Numeral 23 is a digital-to-analog converter (DA converter, hereinafter) for converting the processed digital chrominance signal to a processed analog chrominance signal. Numeral 10 is a recording medium for recording thereon the processed luminance signal and the processed analog chrominance signal.

Numeral 24 is a luminance signal processor for processing the reproduced luminance signal in the reproduced signal processing block to obtain the original luminance signal. Numeral 25 is an AD converter for converting the reproduced analog chrominance signal to a digital chrominance signal. Numeral 26 is a chrominance signal processor for processing the digital chrominance signal. Numeral 27 is a DA converter for converting the processed digital chrominance signal to an analog chrominance signal which is the original chrominance signal. Numeral 18 is a mixer for multiplexing the luminance signal and the chrominance signal to obtain the reproduced video signal which is supplied to the output terminal 19.

Next, the operation of the embodiment in FIG. 2 will be described.

In the recording mode, a color composite signal including the luminance signal and chrominance signal is applied to the input terminal 1. This color composite signal is separated to the luminance signal and the chrominance signal by the low-pass filter 2 and the band-pass filter 3 respectively. The luminance signal is processed at the luminance signal processor to be the FM luminance signal which is then recorded on the recording medium 10 through a magnetic head (not shown). The chrominance signal is converted to a digital signal by the AD converter 21. The AD converter 21 also achieves the pulse code modulation (PCM) which samples the levels of the signal periodically (sampling), and converts each of the sampled data to an integer digital signal (quantizing), the integer digital signal being indicated as a pulse code. The digitalized chrominance signal produced by the AD converter 21 is executed with the processing necessary for recording in digital form by the chrominance signal processor 22. The output signal of the chrominance signal processor 22 is re-converted to an analog signal suitable to be recorded by the DA converter 23. Accordingly, the luminance signal and the chrominance signal are recorded on the recording medium 10 in analog forms together. Since the chrominance signal form recorded on the recording medium is analog, the frequency band necessary for recording is the same as that of the conventional analog signal processing.

In the reproducing mode, the luminance signal reproduced from the recording medium 10 is processed, or frequency-demodulated, for example, and supplied to the mixer 18. The chrominance signal reproduced from the recording medium 10 is digitalized by the AD converter 25, and excuted with the necessary processing in digital form by the chrominance signal processor 26. The digitalized chrominance signal is re-converted to an analog signal which is the original chrominance signal by the DA converter 27, and this analog signal is supplied to the mixer 18. The AD converter 25 and the DA converter 27 are almost the same as the AD converter 21 and the DA converter 23 in the recording mode, respectively. The mixer 18 multiplexes the reproduced original luminance and chrominance signals to produce the original composite color signal which is applied to the output terminal 19.

The embodiment of FIG. 2 shows the concept of the invention that the chrominance signal processings in both the recording and reproducing blocks are excuted in digital forms. Generally, a digital signal processing circuit is easily configured into a large scale integrated circuit (LSI) compared with an analog signal processing circuit because it is the combination of logic circuits which handle the two level data, that is, 'zero' and 'one'. Accordingly, the chrominance signal processing circuit of the invention is made more compact and inexpensive than the conventional analog circuit.

Further, the reason why only the chrominance signal processing is digitalized comes from the realizability of the small-sized AD and DA converters. For digitalizing the luminance signal, the sampling frequency of 10 to 15 MHz and 8 or more number of coding bits are necessary, while for digitalizing the chrominance signal the sampling frequency is 1 to 3 MHz and the number of coding bits is 5 to 6 bits. As well known, the operating frequency and the number of bits are important factor for producing a small-sized integrated AD and DA converters.

Figure 3:
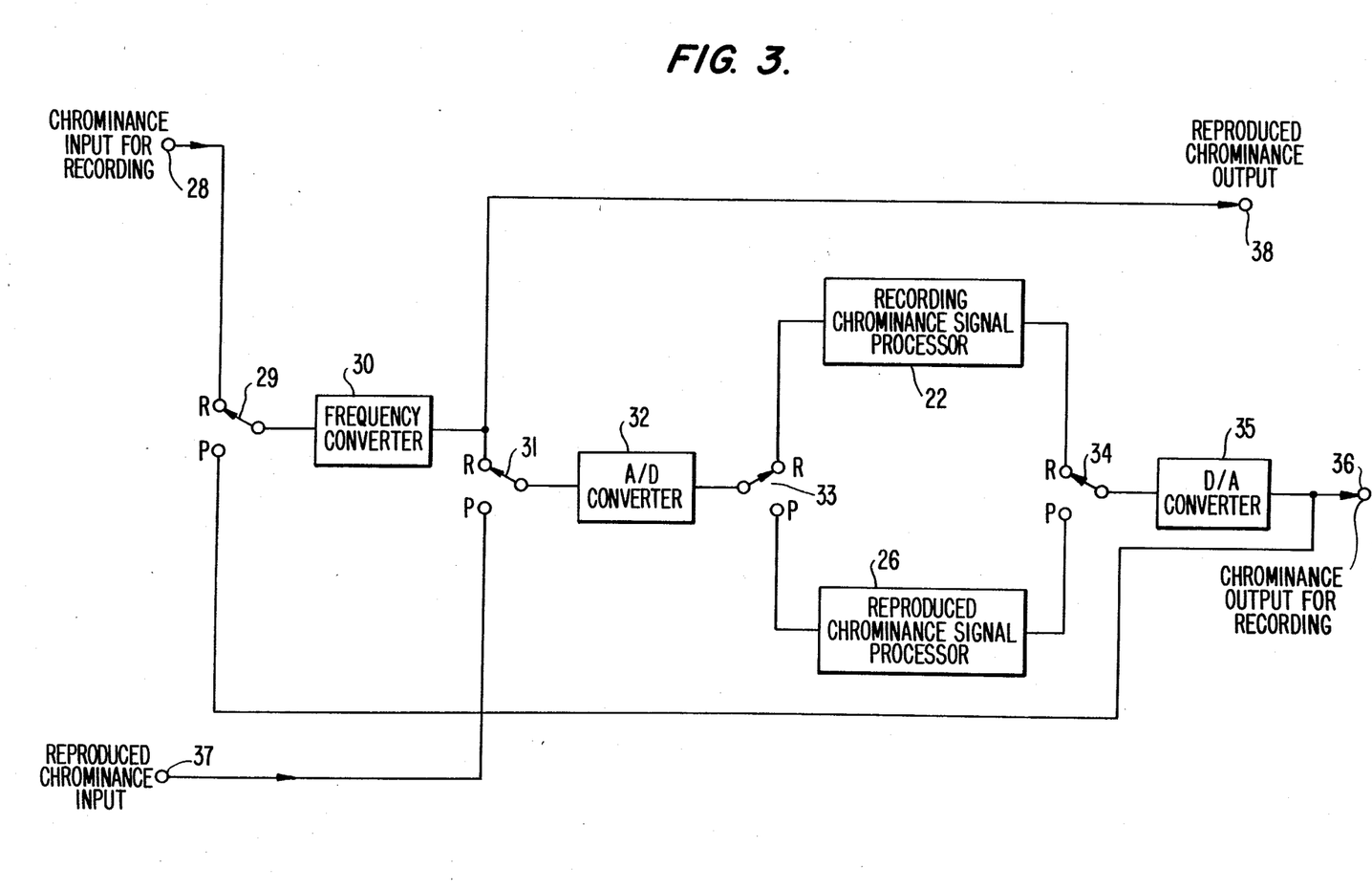
FIG. 3 is a block diagram showing an embodiment of a video signal processing apparatus according to the present invention.

FIG. 3 shows a more simplified example of the chrominance signal processing circuit, wherein an AD converter 32 and an DA converter 35 are shared in both the recording and the reproducing modes, so that the size of the chrominance signal processing circuit as a whole can be reduced.

In the recording mode, the input chrominance signal to be recorded, from a terminal 28 is applied through recording-reproducing changeover switch (R-P switch, hereinafter) 29, and to a frequency converter 30, where it is converted to a down-converted signal. The down-converted chrominance signal is applied through an R-P switch 31 to an AD converter 32, where it is converted to a digital signal. This digital signal is supplied to a recording side chrominance signal processor 22 through an R-P switch 33, and excuted with the digital signal processing necessary in the recording block. The processed digital chrominance signal is applied to a DA converter 35 through an R-P switch 34, and re-converted to an analog signal which is the chrominance signal recordable on the recording medium. This signal is outputted from a terminal 36.

In the reproducing mode, all of the R-P switches are turned to the P terminals. The reproduced chrominance signal (down-converted chrominance signal) from a terminal 37 is applied to the AD converter 32 through the R-P switch 31, where it is digitalized, and then to the reproducing side chrominance signal processor 26 through the R-P switch 33. The reproducing side chrominance signal processor 26 executes the digital signal processing necessary in the reproducing block. The processed digital signal is applied through the R-P switch 34 to the DA converter 35, where it is re-converted to an analog signal. This down-converted chrominance signal from the DA converter 35 is applied through the R-P switch 29 to the frequency converter 30, where it is up-converted to the original chrominance signal. This original chrominance signal is outputted from a terminal 38.

In this embodiment, the frequency converter 30 operates as a down-converter in the recording mode and an up-converter in the reproducing mode. It is evident from the above description that the AD converter 32 is always applied with the down-converted chrominance signal in both the recording and reproducing mode. Therefore the AD converter 32 can be used for both the recording and reproduced chrominance signal processings.

As described above, the configuration in FIG. 3 is advantageous to reduce the size and cost of the chrominance signal processing circuit.

Figure 4:
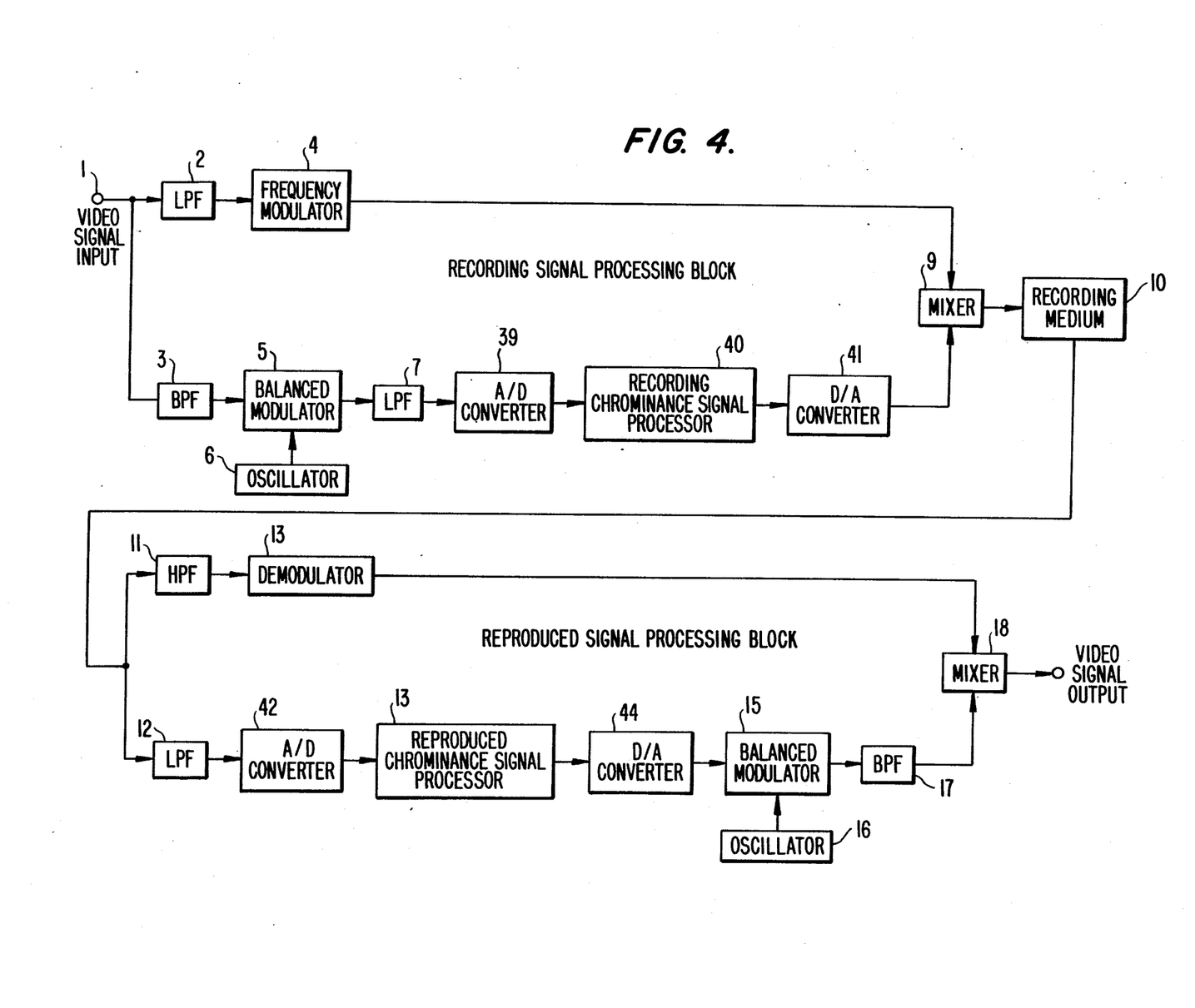
FIG. 4 is a block diagram showing another embodiment of a video signal processing apparatus according to the present invention.

FIG. 4 shows another embodiment of the main part of the chrominance signal processing apparatus of the invention, wherein the same components as those in FIG. 1 are designated by the same reference numerals. For simplifying the description, only the portions different from the conventional signal processing apparatus shown in FIG. 1 will be described hereinafter.

The chrominance signal separated from the input video signal by the band-pass filter 3 has a subcarrier of 3.58 MHz and a frequency band width of ±500 kHz. This signal is down-converted to the lower band than that of the FM luminance signal, e.g. 100 kHz to 1.1 MHz by the balanced modulator 5 with the local oscillator 6 and the low-pass filter 7. The down-converted chrominance signal is applied to an AD converter 39, and converted to a digital signal having the frequency spectrum of 100 kHz to 1.1 MHz. Therefore, the sampling frequency of the AD converter 39 may be low, e.g. 2.5 MHz, and the number of bits of the same may be small, e.g. 6 bits. The digitalized chrominance signal is processed by the recording side chrominance signal processor 40 in digital form, and thereafter, it is re-converted to an analog chrominance signal by a DA converter 41. Since the DA converter 41 operates so as to convert the 6 bit digital signal at the sample frequency of 2.5 MHz, it can be easily configured small-sized. Also, since the chrominance signal reproduced from the recording medium 10 is the down-converted signal whose frequency is 100 kHz to 1.1 MHz, an AD converter 42 and a DA converter 44 are the same in performance as the DA converter 39 and the AD converter 41. The down-converted chrominance signal outputted from the DA converter 44 is converted to the original frequency band signal by the balanced modulator 15 with the local oscillator 16 and the band-pass filter 17.

As described above, this embodiment processes the down-converted signal at the AD converters 39, 42 and the DA converters 41, 44, so that it is very useful to simplify the chrominance signal processing.

In the above description, the digital processing is employed in both the recording and reproduced signal processing blocks. However, since the chrominance signal processing in the recording mode is generally easier than that in the reproducing mode, the digital processing may be employed only in the reproduced signal processing block.

Figure 5:
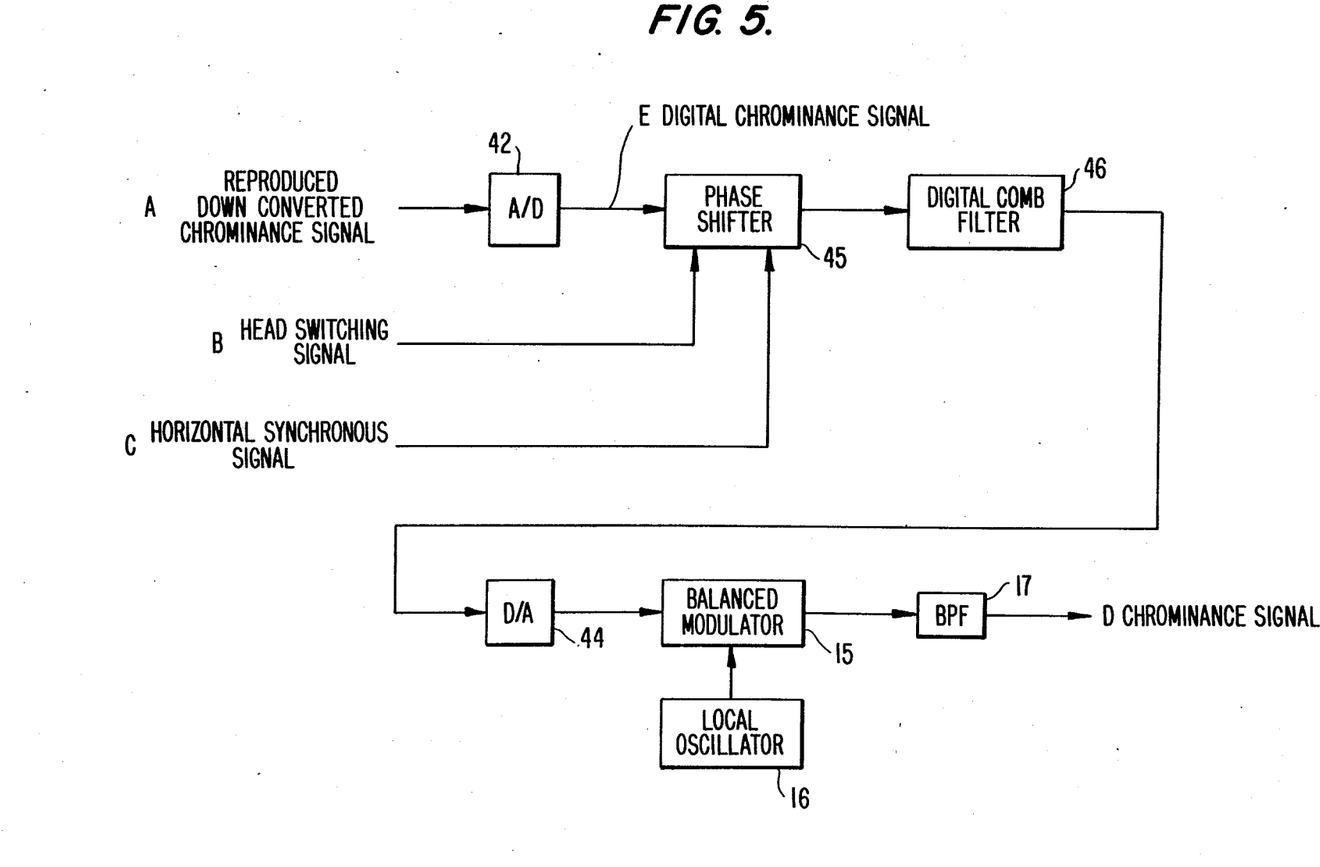
FIG. 5 is a block diagram showing a part of an embodiment of a reproduced chrominance signal processing block according to the present invention.

FIG. 5 shows a block diagram to describe the principle of the reproduced chrominance signal processing according to the invention. The reproduced down-converted chrominance signal, after phase-shifted in each line oppositely to the shift in the recording signal processing, is passed through a comb filter 46. Accordingly, the comb filter 46, effective for the frequency band of the down-converted chrominance signal, is configured by a semiconductor device such as a randum access memory (RAM) and a charge coupled device (CCD), to be small-sized and inexpensive. In conventional chrominance analog signal processing, the comb filter is arranged at the position where the chrominance signal is up-converted to the original frequency band. In FIG. 5, the jitter compensating circuit is omitted to make easier the description, but will be described later.

Referring to FIG. 5, a reproduced down-converted chrominance signal A is converted to a digitalized chrominance signal E, and this digitalized signal is shifted in phase by a phase shifter 45 which is controlled by a head switching signal B and a horizontal synchronous signal C. The output of the phase shifter 45 is applied to the digital comb filter 46, and re-converted to the analog signal by the DA converter 44, and then to the original chrominance signal D by the balance modulator 15 with the local oscillator 16 and the band-pass filter 17. The differences from the conventional processing are that the phase shifting and comb filtering are achieved in digital signal form and that the processing is achieved before the frequency conversion.

Figure 6:
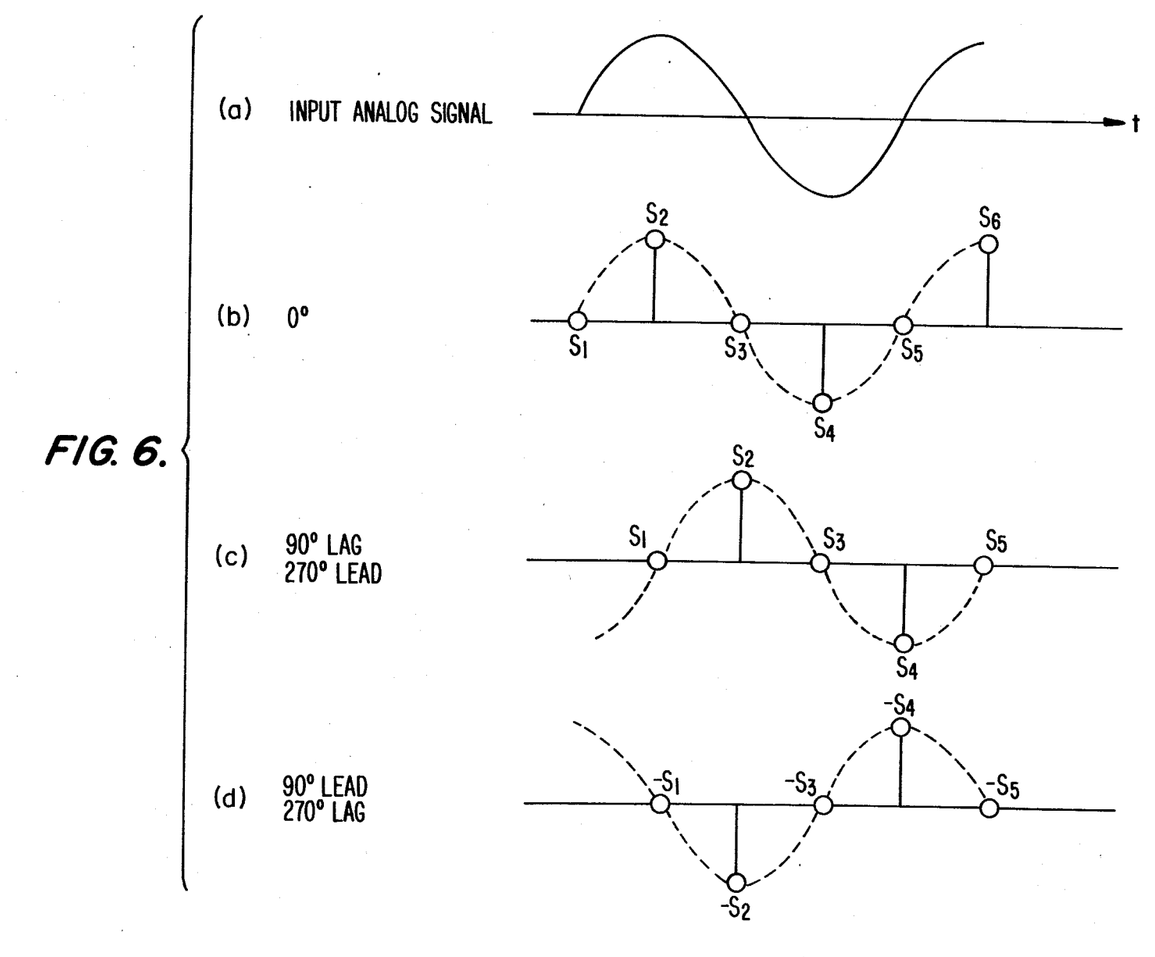
FIG. 6 shows signal charts for explaining the principle of the present invention.

One example of the operation of the phase shifter 45 is shown in FIG. 6. In the VHS VTR, the phase of the chrominance signal has to be lagging or leading by 90° for each line. FIG. 6(a) shows a part of the reproduced down-converted chrominance signal inputted to the AD converter 42. FIG. 6(b) shows the 0° phase-shifted signal waveform, the sample values S1, S2, S3, S4, S5, S6 being digital values of 6 BIT. FIG. 6(c) shows the signal which is 90° lagging (or 270° leading) in phase with respect to the signal of FIG. 6(b). In this case, since the sample frequency is 4 times the subcarrier frequency of the down-converted chrominance signal, the signal of FIG. 6(c) is one sampling period delayed with respect to the signal of FIG. 6(b). FIG. 6(d) shows the signal which is 90° leading (270° lagging) with respect to the signal of FIG. 6(b) This signal is obtained by one sampling period delaying the signal of FIG. 6(b) and inverting the polarity (or digitally, taking the complement). Also, 180° lagging or leading signal can be obtained by inverting the polarity of the signal of FIG. 6(b).

As described above, the phase shifting in digital form is achieved by delaying and/or inverting the digital signal.

Next, the principle to reduce the cross talk of the down-converted chrominance signal from the neighbor track will be described by referring to FIGS. 7 and 8.

Figure 7:
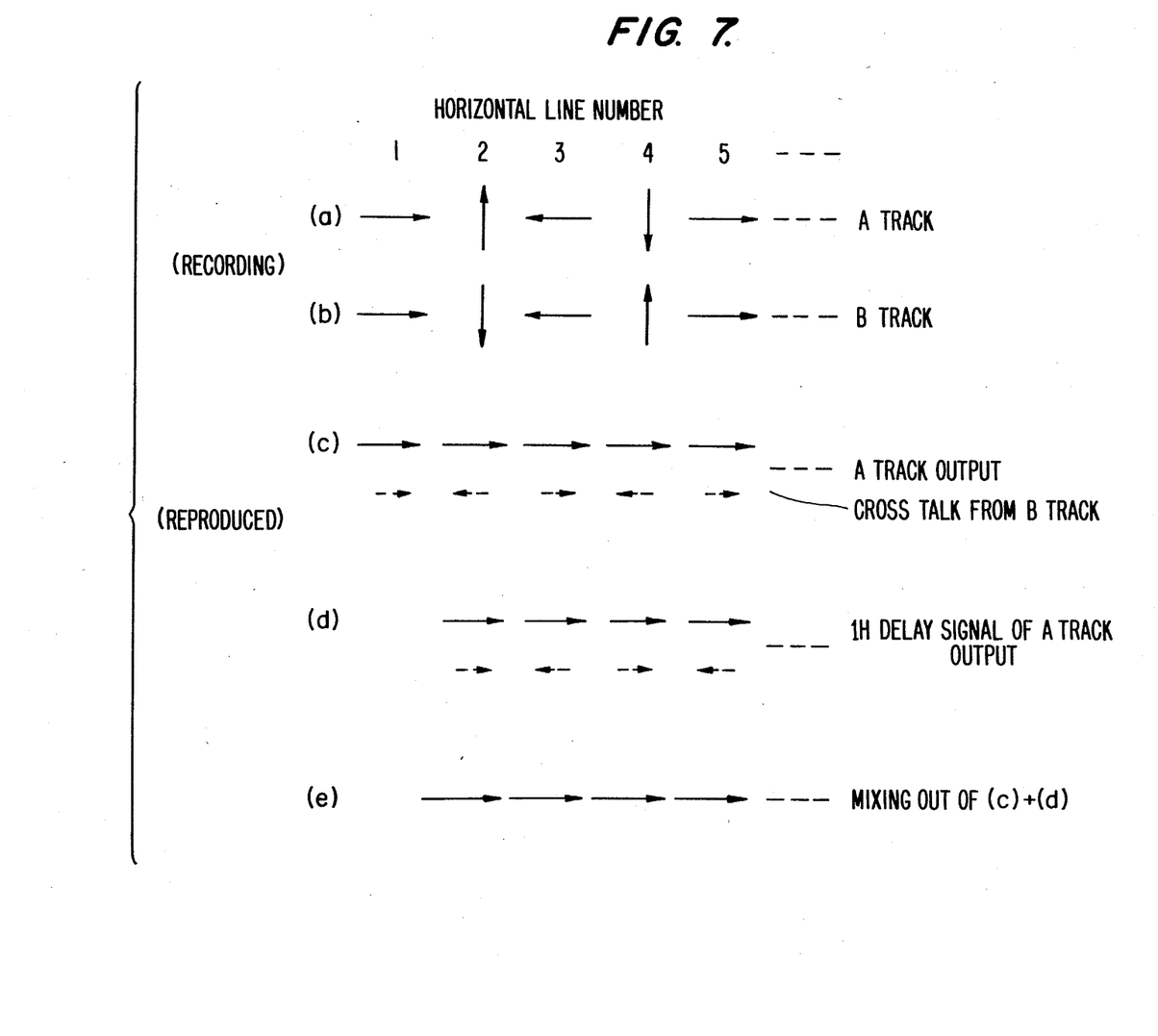
FIG. 7 shows phase diagrams of the chrominance signal and the cross talk signal for explaining the cancellation of the cross talk signal.
Figure 8:
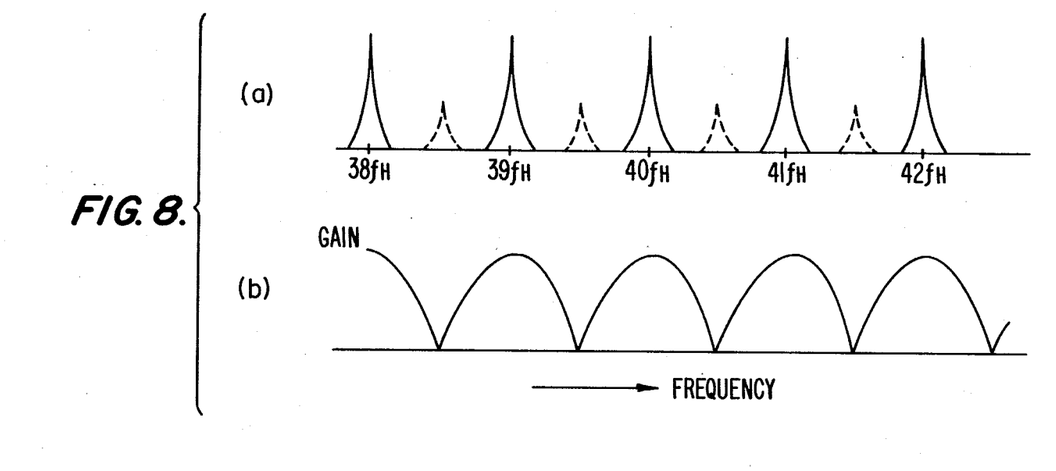
FIG. 8 shows a spectra distribution diagram of the chrominance signal and the characteristic diagram of the comb filter.

The phase of the subcarrier at track A is shifted to lead 90° each line in the recording mode as shown by the solid-line arrow in FIG. 7(a). For example, if the phase is 0° in horizontal line 1, the phase leads 90° in line 2, 80° in line 3, 270° in line 4, and returns to 0° in line 5, this cycle being repeated. At track B, the phase of the subcarrier is shifted to lag 90° each line as shown FIG. 7(b).

In the reproducing mode, since the phase of subcarrier is phase-shifted in the opposite direction to the case in the recording mode so that the phase of the reproduced down-converted chrominance signal returns to the original phase as shown in FIG. 7(c). Generally, when the recorded signal of track A is being reproduced, a part of the recorded signal in track B is also reproduced. This is called the neighbor track cross talk, which is caused because the track width of the reproducing head is wider than the recorded track width and the head is not right on the track. The phase of the neighbor track cross talk signal is shown by the broken-line arrow. Therefore, the reproduced signal from the track A includes the cross talk signal from the track B whose phase is shifted to lag 90° each line.

FIG. 7(e) shows the signal which is delayed 1 horizontal line period (1H) from the signal in FIG. 7(c). The signal (e) is the signal obtained by adding the signal (c) from track A and the 1H delayed signal (d). The neighbor track cross talk signals shown by the broken arrow are cancelled because the phases are opposite to each other, and only the signal from track A is taken out.

Here, to add the reproduced signal (c) and the delayed signal (d) means to pass the signal (c) through the 1 H comb filter. The signal (c) from track A has spectra as shown (a) in FIG. 8. The down-converted chrominance signal in the VHS system has a frequency band of ±500 kHz with respect to the center frequency of 40 $f_H$ ($f_H$ is the horizontal line frequency), and the spectra have peaks with intervals of $f_H$. On the other hand, the phase of the cross talk signal from track B is reversed each line as shown by (c) in FIG. 6, so that the spectra of the cross talk signal appear at the $f_H$ interval areas of the spectra of the main signal from track A. Therefore, by passing the reproduced signal through the comb filter having a characteristic shown in FIG. 8(b) (Y type comb filter), only the main signal having the spectra (a) in FIG. 8 is derived and the cross talk signal is eliminated. In this way, the neighbor track cross talk can be eliminated in the down-converted chrominance signal form.

Figure 9:
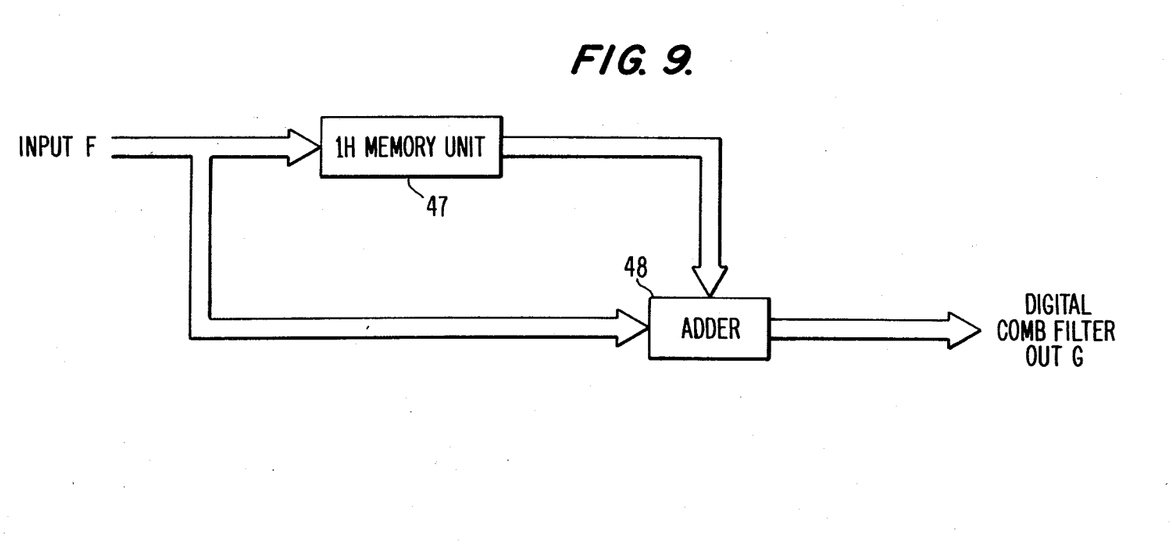
FIG. 9 is a block diagram of a digital comb filter used in the present invention.

The digital comb filter can be configured by using a 1 H digital memory and a digital adder. FIG. 9 shows an example of the digital filter. The input F, which is the digital value corresponding to the phase-shifted and down-converted chrominance signal, is applied to a 1 H memory unit 47 and an adder 48. The adder 48 is also applied with the delayed digital signal from the 1 H memory unit 47 and adds the input signal F with the delayed signal. The output of the adder 48 is a digital signal equivalent to that passed through a digital comb filter.

As described above, the phase-shifting and the comb-filtering can be executed in digital signal form and in the down-converted chrominance signal form. By employing the digital comb filter, the ideal comb filter characteristics and a small-sized circuit can be realized compared with conventional analog comb filter. Therefore, the disadvantages of the conventional comb filter using the 1 H glass delay line, are such as the error of delay time, the variation of frequency characteristics, and the sprious by refrection.

Figure 10:
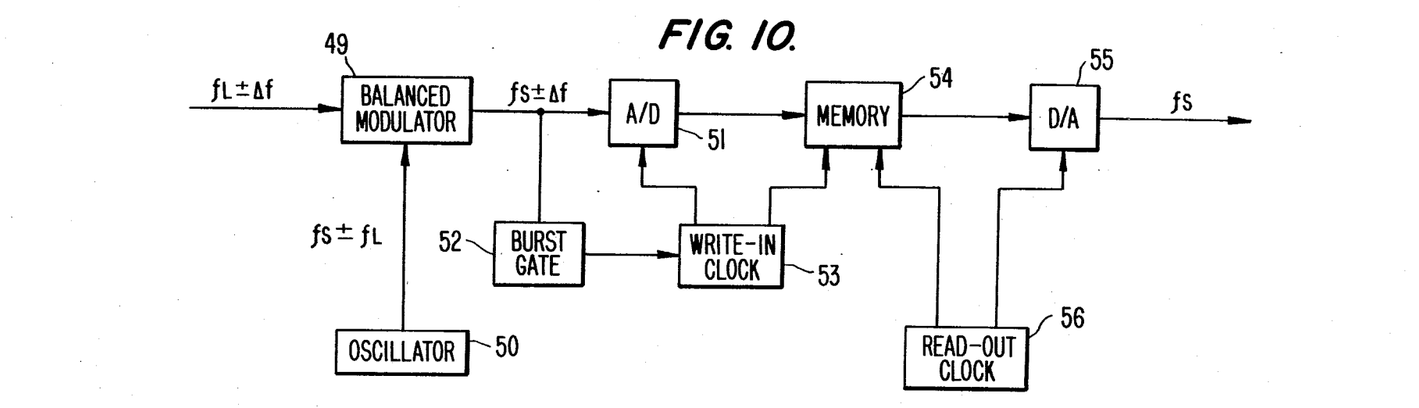
FIG. 10 is a block diagram showing an embodiment of a jitter compensation portion of a video signal processing apparatus according to the present invention.
Figure 11:
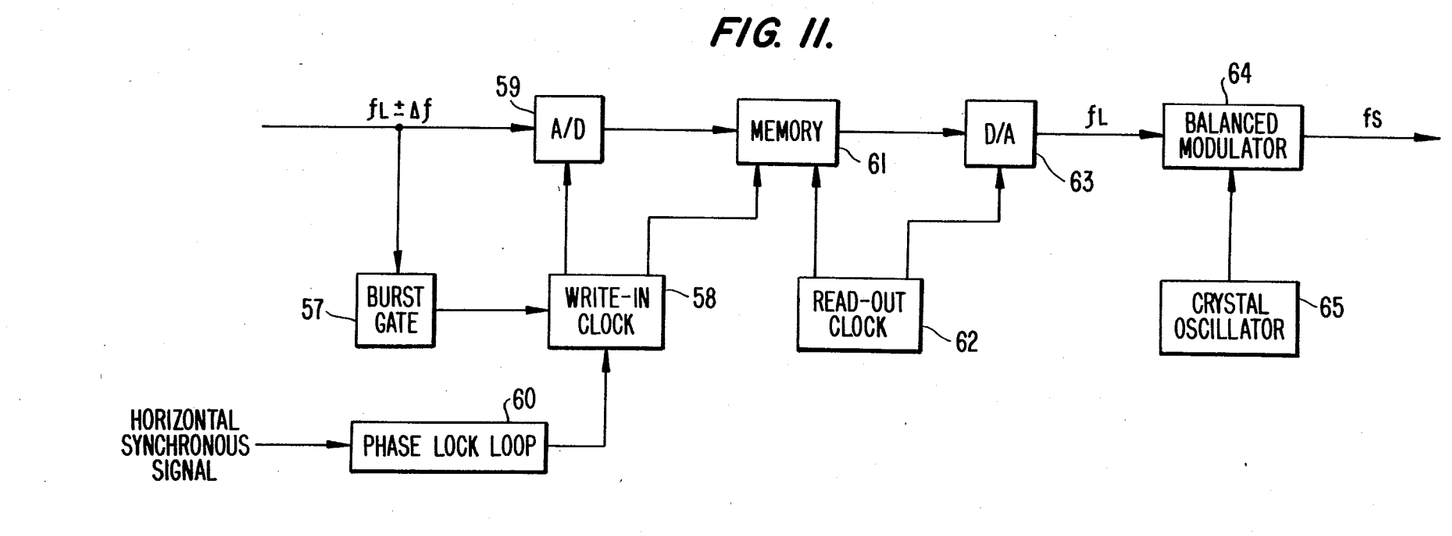
FIG. 11 is a block diagram showing another embodiment of a jitter compensation portion of a video signal processing apparatus according to the present invention.

FIGS. 10 and 11 show embodiments of a digital jitter compensation circuit of the invention. The conventionally used automatic phase control system (APC) for protecting the fluctuation of color picture caused by jitter, is complicated and not stable in operation, because the signal is processed in analog form. The embodiments of FIGS. 10 and 11 reduce the jitter by storing the down-converted digital chrominance signal into a memory unit in response to the time variation of the signal and retrieving the stored signal at a constant clock frequency.

Referring to FIG. 10, the down-converted chrominance signal ($f_L$) having a frequency variation caused by jitter ($\Delta f$), $f_L \pm \Delta f$ is up-converted to $fs \pm \Delta f$ by a balanced modulator 49, the frequency $fs + f_L$ being supplied from a local oscillator 50. The $fs \pm \Delta f$ signal is digitalized by an AD converter 51 and then stored in a memory 54. The write-in clock to the memory 54 is a signal responsive to the frequency variation of the input signal, which is generated by a burst gate 52 and a write-in clock generator 53. Although the input signal to the AD converter 51 has the frequency variation $\Delta f$, the write-in clock also has the same frequency variation. Therefore, the input signal and the write-in clock are in constant phase relation. In addition, the write-in clock is locked to the burst signal of the chrominance signal. The frequency variation of the input signal is eliminated because the address in the memory 54 and the write-in clock have the same frequency variation. Accordingly, the read out signal from the memory 54 by a read-out clock with constant frequency, is a stable chrominance signal without frequency variation. This signal is converted to an analog signal form by a DA converter 55 responsive to a constant frequency clock. In this example, after the reproduced down converted chrominance signal is up-converted to the original chrominance band, the jitter is eliminated. Since the jitter is eliminated in the digitalized chrominance signal form, the stability against temperature variation, long use, and external noises.

Referring to FIG. 11, the reproduced down-converted chrominance signal $f_L$ having a frequency variation $\Delta f$ caused by jitter, $f_L \pm \Delta f$ is digitalized by an AD converter 59. The digitalized signal is stored into a memory 61, where the frequency variation is eliminated in the similar way to that described above. The read out signal from the memory 61 is converted to an analog signal $f_L$ by a DA converter 63. The down-converted chrominance from the DA converter 63 is up-converted to the original chrominance frequency band fs by a balance modulator 64 which is supplied with a constant frequency from a crystal oscillator 65. The sampling clock to the AD converter 59 and the write-in clock to the memory 61 are generated by a write-in clock generator 58 responsive to a signal which is locked to the horizontal synchronous signal of the reproduced video signal from a phase lock loop 60 and a signal which is locked to the burst signal of the reproducded chrominance signal from a burst gate 57. The write-in clock is responsive to the jitter of the reproduced video signal, and the read-out clock is a constant frequency clock supplied from a clock generator 62. As the result, the jitter contained in the down-converted chrominance signal is completely eliminated. In this case, because the reproduced down-converted chrominance signal is digitalized directly and the jitter is eliminated in digital form, a sure and stable jitter compensation can be achieved by a small-sized digital circuit.

There have been described hereinbefore preferred embodiments of the invention, and it should be understood that various changes and modifications may be made without departing from the spirit and scope of the invention.

As described above in detail, the important factor according to the invention is that the chrominance signal processing in VTR is achieved in digital signal form. This makes easy the production of the large scale integrated circuit (LSI). As a result, the number of components in the signal processing apparatus can be reduced, and also the number of adjusting points of the apparatus can be reduced. Accordingly, very economical production of the video tape recorders can be realized.

What is claimed is:

1. A video signal processing signal for recording a video signal onto a recording medium and for reproducing the recorded video signal from said recording medium, comprising:
    a first separating means for separating an input video signal into a luminance signal and a chorminance signal;
    a second separating means for separating a reproduced signal from said recording medium into a reproduced luminance signal and a reproduced chrominance signal;
    an analog luminance signal processing means for processing said luminance signal from said first separating means in an analog form so as to produce a recordable luminance signal and for processing said reproduced luminance signal from said second separting means in an analog form so as to produce an original luminance signal;
    a digital chrominance signal processing means for digitally processing said chrominance signal from said first separating means so as to rpoduce a recordable chrominance signal and for digitally processing said reproduced chrominance signal from said second separating means so as to produce an origianl chrominance signal;
    a first mixing means for mixing said recordable luminance and chrominance signals, the mixed recordable signal being recorded in an analog form on said recording medium; and a second mixing means for mixing said original luminance and chrominance signals to produce an original video signal.

2. An apparatus according to claim 1, wherein said digital chrominance signal processing means comprises:
a first A/D converter coupled to said first separating means for converting an analog chrominance signal into a digital signal;
a first digital chrominance signal processor for processing said digital signal from said first A/D converter;
a first D/A converter for converting a digital output signal from said first digital chrominance signal processor into said recordable chrominance signal;
a seocnd A/D converter for converting said reproduced chrominance signal from said second separating means into a digital signal;
a second digital chrominance signal processor for processing said digital signal from said second A/D converter; and
a second D/A converter for converting a digital output signal from said second digital chrominance signal processor into an analog chrominance signal which supplied to said second mixing means as said original chrominance signal.

3. An apparatus according to claim 2, further comprising a first balanced modulator coupled to said first separating means for down-converting the frequency band of said chrominance signal from said first separating means, and a second balanced modulator coupled to said second D/A converter for up-converting the frequency band of said analog chrominance signal from said second D/A converter to produce said original chrominance signal; wherein said first digital chrominance signal processor comprises a first digital phase shifter for shifting the phase of said digital signal from said first A/D converter, and said second digital chrominance signal processor comprises a second digital phase shifter for shifting the phase of said digital signal from said second A/D converter in a direction which is opposite to the direction shifted by said first digital phase shifter; and a digital comb filter for filtering the phase-shifted signal from said second digital phase shifter so as to eliminate a crosstalk signal contained in said reproduced chrominance signal.

4. An apparatus according to claim 3, wherein the amount phase-shifted by each of said first and second digital phase shifter is +90° or −90° each horizontal line period.

5. An apparatus according to claim 3, wherein said digital comb filter comprises a memory for storing said phase-shifted signal from said second digital phase shifter in one horizontal period and an adder for adding an output signal from said memory with said phase-shifted signal from said second phase shifter, the output of said adder being coupled to the input of said second D/A converter.

6. An apparatus according to claim 2, wherein said second digital chrominance signal processor comprises:
a memory for storing said digital signal from said second A/D converter; a write signal generator for generating a write-in signal which determines a write-in timing of said memory; and a read signal generator for generating a read-out signal which determines a read-out timing of said memmory, the output of said memory being coupled to the input of said second D/A converter, wherein said write-in signal varies according to a jitter for said reproduced chrominance signal, and said read-out signal being a constant period signal, whereby said jitter is eliminated only from said reproduced chrominance signal.

7. An apparatus according to claim 1, wherein said digital chrominance signal processing means comprises:
a first input terminal for inputting said chrominance signal from said first separating means;
a first output terminal for outputting said recordable chrominance signal to said first mixing means;
a second input terminal for inputting said reproduced chrominance signal from said second separating means;
a second output terminal for outputting said original chrominance signal to said second mixing means;
a frequency converter for down-converter a sub-carrier frequency of said chrominance signal from said first separating means in a recording mode so as to obtain a down-converted chrominance signal and up-converting a subcarrier frequency of a down-converted signal obtained from said reproduced chrominance signal in a reproducing mode so as to obtain said original chrominance signal;
a first change-over switch having a common terminal connected to an input terminal of said frequency converter, and a first terminal connected to said first input terminal, and a second terminal connected to said first output terminal;
an A/D converter for converting an analog signal inputted thereto to a digital signal;
a second change-over switch having a common terminal connected to an input terminal of said A/D converter, a first terminal connected to both an output terminal of said frequency converter and said second output terminal, and a second terminal connected to said second input terminal;
a first digital chrominance signal processor for processing a digitalized down-converter chrominance signal from said A/D converter in the recording mode to obtain another digital signal which corresponds to said recordable chrominance signal;
a second digital chorminance signal processor for processing a digitalized reproduced chrominance signal from said A/D converter in the reproducing mode to obtain another digital signal which corresponds to said down-converted chrominance signal;
a third change-over switch having a common terminal connected to an output terminal of said A/D converter, and a first terminal connected to an input terminal of said first digital chrominance signal processor, and a second terminal connected to an input terminal of said second digital chrominance signal processor;
a D/A converter for converting an analog signal inputted thereto to a digital signal; and
a fourth change-over switch having a common terminal connected to said first output terminal, and a first terminal connected to an output terminal of said first digital chrominance signal processor, and a second terminal connected to an output terminal of said second digital chrominance signal processor;
wherein, in each of said first through fourth change-over switches, said common terminal is connected to said first terminal of each switch in the recording mode and to said second terminal of each switch in the reproducing mode.

8. A video signal processing apparatus for recording a video signal onto a recording medium and for reproducing the recorded video signal from said recording medium, comprising:
- a first separating means for separating an input video signal into a luminance signal and a chrominance signal;
- a second separating means for separating a reproduced signal from said recording medium into a reproduced luminance signal and a reproduced chrominance signal;
- an analog luminance signal processing means for processing said luminance signal from said first separating means in an analog form so as to produce a recordable luminance signal and for processing said reproduced luminance signal from said second separating means in an analog form so as to produce an original luminance signal;
- a first chrominance signal processing means for processing said chrominance signal from said first separating means so as to produce a recordable chrominance signal;
- a second chrominance signal processing means for digitally processing said reproduced chrominance signal from said second separating means so as to produce an original chrominance signal;
- a first mixing means for mixing said recordable luminance and chrominance signals, the mixed recordable signal being recorded onto said recording medium; and
- a second mixing means for mixing said orignal luminance and chrominance signals so as to produce an original video signal.

9. An apparatus according to claim 8, wherein said first chrominance signal processing means comprises: a first balanced modulator for down-converting the frequency band of said chrominance signal from said first separating means; and a phase shifter for shifting the phase of the down-converted chrominance signal from said first balanced modulator so as to produce said recordable chrominance signal, and wherein said second chrominance signal processing means comprises: an A/D converter for converting said reproduced chrominance signal into a digital signal; a digital phase shifter for shifting the phase of said digital signal in a direction which is opposite to the direction shifted by said phase shifter; a digital comb filter for filtering the phase-shifted digital signal from said digital phase shifter so as to thereby eliminate a crosstalk signal contained in said reproduced chrominance signal; a D/A converter for converting the filtered digital signal from said digital comb filter into an original down-converted chrominance signal; and a second balanced modulator for up-converting the frequency band of said down-converted chrominance signal so as to produce said original chrominance signal so as to produce said original chrominance signal which is supplied to said second mixing means.

10. An apparatus according to claim 9, wherein the amount phase-shifted by each of said phase shifter and said digital phase shifter is +90° or −90° each horizontal line period.

11. An apparatus according to claim 9, wherein said digital comb filter comprises a memory for storing said phase-shifted signal from said digital phase shifter in one horizontal period and an adder for adding an output signal from said memory to said phase-shifted signal from said second phase shifter, an output of said adder being coupled to the input of said D/A converter.

12. An apparatus according to claim 8, wherein said second chrominance signal processing means comprises: an A/D converter for converting said reproduced chrominance signal into a digital signal; a memory for storing said digital signal from said A/D converter; a D/A converter for converting an output signal from said memory into said original chrominance signal; a write signal generator for generating a write-in signal which determines a write-in timing of said memory; and a read signal generator for generating a read-out signal which determines a read-out timing of said memory, wherein said write-in signal varies according to a jitter of said reproduced chrominance signal, and said read-out signal being constant period signal, whereby said jitter is eliminated only from said reproduced chrominance signal.

13. An apparatus according to claim 12, wherein said second chrominance signal processing means further comprises a balanced modulator for up-converting the frequency band of an output signal from said D/A converter to produce said original chrominance signal; wherein said write signal generator comprises: a burst gate for gating a burst signal contained in said original chrominance signal from said balanced modulator and a clock signal generator responsive to the gated burst signal from said burst gate for generating said write-in signal.

14. An apparatus according to claim 12, wherein said write signal generator comprises: a burst gate for gating a burst signal contained in said reproduced chrominance signal and a clock signal generator responsive to the gated burst signal from said burst gate for generating said write-in signal.

15. An apparatus according to claim 12, wherein said write signal generator comprises: a phase-locked loop circuit responsive to the horizontal synchronous signal contained in said reproduced luminance signal and a clock signal generator responsive to an output signal of said phase-locked loop circuit for generating said write-in signal.

16. A video signal processing apparatus for recording a video signal onto a recording medium and for reproducing the recorded video signal from said recording medium, comprising:
- a first separating means for separating an input video signal into a luminance signal and a chrominance signal;
- a second separating means for separating a reproduced signal from said recording medium into a reproduced luminance signal and a reproduced chrominance signal;
- a luminance signal processing means for processing said luminance signal from said first separating means so as to produce a recordable luminance signal and for processing said reproduced luminance signal from said second separating means so as to produce an original luminance signal;
- a first balanced modulator for down-converting the frequency band of said chrominance signal from said first separating means;
- a first phase shifter for shifting the phase of the down-converted chrominance signal from said first balanced modulator so as to produce a recordable chrominance signal;
- a first mixing means for mixing said recordable luminance and chrominance signals, the mixed recordable signal being recorded onto said recording medium;

an A/D converter for converting said reproduced chrominance signal from said second separating means into a digital signal;

a digital phase shifter for shifting the phase of said digital signal from said A/D converter in a direction which is opposite to the direction shifted by said first phase shifter;

a digital comb filter for filtering the phase-shifted signal from said digital phase shifter so as to eliminate a crosstalk signal contained in said reproduced chrominance signal;

a digital jitter compensation means for eliminating a jitter of said reproduced chrominance signal;

a D/A converter for converting an output digital signal from said digital jitter compensation means into an original down-converted chrominance signal;

a second balanced modulator for up-converting the frequency band of said down-converted chrominance signal from said D/A converter so as to produce an original chrominance signal; and a second mixing means for mixing said original luminance and chrominance signals so as to produce an original video signal.

17. An apparatus according to claim 16, wherein the amount phase-shifted by each of said first phase shifter and said digital phase shifter is +90° or −90° each horizontal line period.

18. An apparatus according to claim 17, wherein said digital comb filter comprises: a first memory for storing the phase-shifted digital signal in one horizontal line period so as to obtain a signal delayed one horizontal line period; and an adder for adding the phase-shifted digital signal from said digital phase-shifted to the delayed signal from said first memory, so as to thereby eliminate a crosstalk signal contained in said reproduced chrominance signal.

19. An apparatus according to claim 18, wherein said digital jitter compensation means comprises: a second memory for storing the output signal from said digital comb filter; a write signal generator for generating a write-in signal which determines a write-in timing of said second memory; and a read signal generator for generating a read-out signal which determines a read-out timing of said second memory, wherein said write-in signal varies according to a jitter of said reproduced chrominance signal, and said read-out signal being a constant period signal, whereby said jitter is eliminated.

20. An apparatus according to claim 19, wherein said write signal generator comprises: a burst gate for gating a burst signal contained in said reproduced chrominance signal; a phase-locked loop circuit responsive to the horizontal synchronous signal contained in said reproduced luminance signal; and a clock signal burst gate and an output signal from said phase-locked loop circuit for generating said write-in signal.

21. A video signal processing signal for recording a video signal onto a recording medium and for reproducing the recorded video signal from said recording medium, comprising:

a first separating means for separating an input video signal into a luminance signal and a chrominance signal;

a second separating means for separating a reproduced signal from said recording medium into a reproduced luminance signal and a reproduced chrominance signal;

a luminance signal processing means for processing said luminance signal from said first separating means so as to produce a recordable luminance signal and for processing said reproduced luminance signal from said second separating means so as to produce an original luminance signal;

a digital chrominance signal processing means for digitally processing said chrominance signal from said first separating means so as to produce a recordable chrominance signal and for digitally processing said reproduced chrominance signal from said second separating means so as to produce an original chrominance signal;

a first mixing means for mixing said recordable luminance and chrominance signals, the mixed recordable signal being recorded on said recording medium; and a second mixing means for mixing said original luminance and chrominance signals to produce an original video signal;

wherein said digital chrominance signal processing means comprises:

a fist input terminal for inputting said chorminance signal from said first separating means;

a first output terminal for outputting said recordable chrominance signal to said first mixing means;

a second input terminal for inputting said reproduced chrominance signal from said second separating means;

a second output terminal for outputting said original chrominance signal to said second mixing means;

a frequency converter for down-converter a sub-carrier frequency of said chrominance signal from said first separating means in a recording mode so as to obtain a down-converted chrominance signal and up-converting a subcarrier frequency of a down-converted signal obtained from said reproduced chrominance signal in a reproducing mode so as to obtain said original chrominance signal;

a first change-over switch having a common terminal connected to an input terminal of said frequency converter, and a first terminal connected to said first input terminal, and a second terminal connected to said first output terminal;

an A/D converter for converting an analog signal inputted thereto to a digital signal;

a second change-over switch having a common terminal connected to an input terminal of said A/D converter, a first terminal connected to both an output terminal of said frequency converter and said second output terminal, and a second terminal connected to said second input terminal;

a first digital chrominance signal processor for processing a digitalized down-converter chrominance signal from said A/D converter in the recording mode to obtain another digital signal which corresponds to said recordable chrominance signal;

a second digital chrominance signal processor for processing a digitalized reproduced chrominance signal from said A/D converter in the reproducing mode to obtain another digital signal which corresponds to said down-converted chrominance signal;

a third change-over switch having a common terminal connected to an output terminal of said A/D converter, and a first terminal connected to an input terminal of said first digital chrominance signal processor, and a second terminal connected to an input terminal of said second digital chrominance signal processor;

a D/A converter for converting an analog signal inputted thereto to a digital signal; and a fourth change-over switch having a common terminal connected to said first output terminal, and a first terminal connected to an output terminal of said first digital chrominance signal processor, and a second terminal connected to an output terminal of said second digital chrominance signal processor;

wherein, in each of said first through fourth change-over switches, said common terminal is connected to said first terminal of each switch in the recording mode and to said second terminal of each switch in the reproducing mode.

* * * * *